United States Patent
Gisewhite et al.

(10) Patent No.: US 11,584,691 B2
(45) Date of Patent: *Feb. 21, 2023

(54) JAMB SPRAY MIXES INCLUDING FUSED SILICA AND METHODS OF UTILIZING THE MIXES

(71) Applicant: Resco Products, Inc., Pittsburgh, PA (US)

(72) Inventors: Thomas H. Gisewhite, Warren, OH (US); Mark C. Langenohl, Venetia, PA (US); Lynn G. McGregor, Brunswick, OH (US)

(73) Assignee: RESCO PRODUCTS, INC., Pittsburgh, PA (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/369,476

(22) Filed: Jul. 7, 2021

(65) Prior Publication Data

US 2021/0331981 A1 Oct. 28, 2021

Related U.S. Application Data

(60) Continuation of application No. 16/441,757, filed on Jun. 14, 2019, now abandoned, which is a division of application No. 15/555,102, filed as application No. PCT/US2017/039024 on Jun. 23, 2017, now Pat. No. 10,364,187.

(60) Provisional application No. 62/362,125, filed on Jul. 14, 2016.

(51) Int. Cl.
| | |
|---|---|
| *C04B 28/32* | (2006.01) |
| *C10B 29/06* | (2006.01) |
| *C04B 35/14* | (2006.01) |
| *C04B 35/66* | (2006.01) |
| *F27D 1/16* | (2006.01) |
| *C21C 5/44* | (2006.01) |
| *C04B 28/34* | (2006.01) |
| *C04B 111/00* | (2006.01) |

(52) U.S. Cl.
CPC ............ *C04B 28/344* (2013.01); *C10B 29/06* (2013.01); *F27D 1/1636* (2013.01); *C04B 2111/00146* (2013.01); *C04B 2111/00551* (2013.01); *C21C 5/44* (2013.01)

(58) Field of Classification Search
CPC ....... C04B 35/66; C04B 35/14; C04B 28/344; C10B 29/06

See application file for complete search history.

(56) References Cited

U.S. PATENT DOCUMENTS

| | | |
|---|---|---|
| 3,463,650 A | 8/1969 | Pavlica et al. |
| 3,814,613 A | 6/1974 | Hubble et al. |
| 4,188,229 A | 2/1980 | Reven |
| 4,469,309 A | 9/1984 | Takashima et al. |
| 5,512,325 A | 4/1996 | Langenohl et al. |
| 6,458,732 B1 | 10/2002 | Doza et al. |
| 7,060,357 B2 | 6/2006 | Ohrbom et al. |
| 7,309,674 B2 | 12/2007 | Sabre et al. |
| 2007/0027023 A1* | 2/2007 | Sabre ............... C10B 29/06 501/133 |
| 2019/0119164 A1 | 4/2019 | Gisewhite et al. |

FOREIGN PATENT DOCUMENTS

| | | |
|---|---|---|
| CA | 1233840 A | 3/1988 |
| CN | 105330159 A | 2/2016 |
| EP | 0007646 A1 | 2/1980 |
| EP | 0908428 A1 | 4/1999 |
| JP | S62-197371 A | 9/1987 |
| JP | 2004-168586 A | 6/2004 |
| JP | 2016-3313 A | 1/2016 |

OTHER PUBLICATIONS

"JAMB COAT P 99" Product Data Sheet, Pittsburgh, Pennsylvania, Resco Products, Inc., Apr. 13, 2016, 1 page.
"JAMB COAT P Dry" Product Data Sheet, Pittsburgh, Pennsylvania, Resco Products, Inc., Apr. 13, 2016, 1 page.

* cited by examiner

*Primary Examiner* — Karl E Group
(74) *Attorney, Agent, or Firm* — K&L Gates LLP

(57) ABSTRACT

A dry composition formulated to be combined with water to form a jamb spray mix, the dry composition comprising, by weight: 0.1% to 10% phosphate by weight based on total weight of the dry composition; 5% to 15% plasticizer by weight based on total weight of the dry composition; and the balance including fused silica particles and impurities.

21 Claims, No Drawings

JAMB SPRAY MIXES INCLUDING FUSED SILICA AND METHODS OF UTILIZING THE MIXES

CROSS-REFERENCE TO RELATED APPLICATIONS

This patent application is a continuation application claiming priority under 35 U.S.C. § 120 to U.S. patent application Ser. No. 16/441,757, filed Jun. 14, 2019, now abandoned, which application is a divisional application claiming priority under 35 U.S.C. § 120 to U.S. patent application Ser. No. 15/555,102, filed Sep. 1, 2017, issued as U.S. Pat. No. 10,364,187, which is a national stage entry of International Patent Application No. PCT/US2017/039024, which claims priority from U.S. Provisional Patent Application No. 62/362,125, filed Jul. 14, 2016. The entire disclosure of each such application is hereby incorporated herein by reference.

BACKGROUND OF THE TECHNOLOGY

Field of Technology

The present disclosure relates to coke oven door jamb spray mixes and methods for utilizing the mixes. In particular, certain non-limiting aspects of the present disclosure relate to a jamb spray mix including certain materials and having advantageous properties in treating a refractory surface region in a coke oven.

Description of the Background of the Technology

In the production of metallurgical coke, it is typical to employ a coke oven built with refractory bricks to bake the coal at high temperatures. Through continued use, the refractory bricks may become worn, which potentially results in erosion and loss of wall thickness, increased surface abrasiveness, and spalling of the refractory brick surface region. As the bricks wear, byproduct gases may seep through the oven wall, which can adversely impact the emissions level of the coke oven. As such, periodic maintenance and repair of the refractory brick walls of a coke oven is needed to ensure optimal operation. A spray sealant may be used to seal cracks in the coke oven walls by applying a thin layer of a high temperature-resistant sealing material to all or a region of the refractory brick surface within the oven chamber. Such spray products are known in the art as "jamb sprays" because one purpose of such sprays is to seal around the jamb of the oven's access door. Jamb sprays are produced or pre-mixed with a high water content, on the order of at least 20% by weight, and can be applied using a simple pressure spray apparatus including a conventional applicator wand. Because jamb sprays have such a high water content, they are applied as a thin coating to the oven walls, and a typical coating thickness is 0.5 to 50 mm.

Jamb sprays differ fundamentally from "gunning mixes", which are applied to the interior walls of coke ovens to repair the walls. Gunning mixes typically have much lower water content and are much more granular and viscous than jamb sprays, and have a consistency similar to wet concrete. Gunning mixes are applied using gunning equipment, which includes a rotary gunning machine and a specially constructed mixing water injection ring before the nozzle that mixes water with the dry or semi-dry gunning mix as it is sprayed from the nozzle. Because a gunning mix is quite viscous, the application process can be involved and commonly requires a crew of three to five people to apply the gunning mix onto the oven walls, trowel the wet material into crack and to provide a proper surface texture, and clean up the significant overspray that is a common occurrence when gunning. Gunning mixes are applied as relatively thick coatings (typically minimum 50 mm), much thicker than jamb spray coatings; can be as thick as the total depth of the wall lining, which can be 10 cm to 13 cm thick; and are used to restore the oven wall's profile and structural integrity.

SUMMARY

One non-limiting aspect of the present disclosure is directed to embodiments of a jamb spray mix, and to embodiments of a dry composition formulated to be combined with water to form a jamb spray mix. The jamb spray mix comprises: 0.1% to 10% phosphate by weight based on total weight of dry ingredients in the mix; 5% to 15% plasticizer by weight based on total weight of dry ingredients in the mix; the balance of the dry ingredients including fused silica particles and impurities; and at least 20% water by weight based on total weight of the mix.

A non-limiting aspect of the present disclosure is directed to embodiments of a method of treating a refractory brick surface region in a coke oven. The method comprises: combining water and a composition comprising 0.1% to 10% phosphate by weight based on total dry weight of the composition, 5% to 15% plasticizer based on total dry weight of the composition, and the balance of the dry composition including fused silica particles and impurities, thereby forming a jamb spray mix comprising at least 20% by weight water based on total weight of the mix; and applying a coating of the jamb spray mix to the refractory brick surface region using an air pressurized applicator and associated nozzle.

DETAILED DESCRIPTION OF CERTAIN NON-LIMITING EMBODIMENTS

The reader will appreciate the foregoing details, as well as others, upon considering the following detailed description of certain non-limiting embodiments of compositions and methods according to the present disclosure. The reader also may comprehend certain of such additional details upon using the mixes, compositions, and methods described herein.

In the present description of non-limiting embodiments and in the claims, other than in the operating examples or where otherwise indicated, all numbers expressing quantities or characteristics of ingredients and products, processing conditions, and the like are to be understood as being modified in all instances by the term "about." Accordingly, unless indicated to the contrary, any numerical parameters set forth in the following description and the attached claims are approximations that may vary depending upon the desired properties one seeks to obtain in the compositions and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

The present disclosure, in part, is directed to a jamb spray mix, and to a dry composition formulated to be combined with water to form a jamb spray mix. A "jamb spray" is a term of art and will be readily understood by those having ordinary skill in the maintenance of a coke oven. Typically, a jamb spray is utilized to seal cracks in the interior refractory walls of a coke oven. It is to be understood that the term "jamb spray" as used herein is directed to a spray that may be applied to any high temperature-resistant refractory surface of a coke oven in a generic sense and is not limited to, but does not exclude, application to coke oven door jambs. Certain embodiments of a jamb spray mix according to the present disclosure comprise: 0.1% to 10% phosphate by weight based on total weight of dry ingredients in the mix; 5% to 15% plasticizer by weight based on total weight of dry ingredients in the mix; the balance of the dry ingredients in the mix including fused silica particles and impurities; and at least 20% water by weight based on total weight of the jamb spray mix. The jamb spray mix is formed by combining the dry ingredients and the water and any other wet ingredients.

According to certain non-limiting embodiments, the jamb spray mix of the present disclosure comprises 60% to 95% fused silica particles by weight based on total weight of dry ingredients in the mix. In certain non-limiting embodiments, the jamb spray mix of the present disclosure comprises 70% to 90% fused silica particles by weight based on the total weight of dry ingredients in the mix. In further non-limiting embodiments, the jamb spray mix of the present disclosure comprises 80% to 90% fused silica particles by weight based on total weight of dry ingredients in the mix. "Fused silica", which also is known as "amorphous silica", is a non-crystalline form of silica readily known to those having ordinary skill in refractory compositions and the construction and maintenance of coke ovens. Fused silica can be produced by melting silica sand in an electric arc furnace and cooling the molten material in a manner that provides a non-crystalline material. Fused silica has very low thermal expansion properties, which imparts resistance to thermal cycling and thermal shock, and thereby can reduce the incidence of cracking and/or spalling. The present inventors unexpectedly observed that a novel jamb spray mix composition according to the present disclosure including a high content of fused silica may provide better high temperature performance, be easier to install on refractory surfaces, and last significantly longer than conventional jamb spray products on the market.

According to certain non-limiting embodiments, the fused silica particles of the jamb spray mix of the present disclosure comprise at least two fused silica particle fractions with different particle size distributions. According to further non-limiting embodiments, the fused silica particle fractions include at least one of a first fused silica particle fraction sized −30 mesh to +50 mesh, a second fused silica particle fraction sized −50 mesh to +100 mesh, and a third fused silica particle fraction sized −120 mesh. In other non-limiting embodiments, the jamb spray mix of the present disclosure includes, by weight based on total dry ingredients in the mix, at least one fused silica particle fraction selected from: 15% to 30% of fused silica particles sized −30 mesh to +50 mesh; 25% to 45% of fused silica particles sized −50 mesh to +100 mesh; and 18% to 35% of fused silica particles sized −120 mesh. In other non-limiting embodiments, the jamb spray mix of the present disclosure includes, by weight based on total weight of dry ingredients in the mix, at least one fused silica particle fraction selected from: 18% to 28% of fused silica particles sized −30 mesh to +50 mesh; 28% to 40% of fused silica particles sized −50 mesh to +100 mesh; and 21% to 31% of fused silica particles sized −120 mesh. In other non-limiting embodiments, the jamb spray mix of the present disclosure includes, by weight based on total weight of dry ingredients in the mix, at least one fused silica particle fraction selected from: 20% to 25% of fused silica particles sized −30 mesh to +50 mesh; 32% to 38% of fused silica particles sized −50 mesh to +100 mesh; and 24% to 28% of fused silica particles sized −120 mesh.

"−30 Mesh to +50 mesh" as used herein refers to a particle size distribution in which at least 90% of the particles pass through a 30-mesh sieve (opening size 0.60 mm) and are retained on a 50-mesh sieve (opening size 0.30 mm). "−50 Mesh to +100 mesh" as used herein refers to a particle size distribution in which at least 90% of the particles pass through a 50-mesh sieve and are retained on a 100-mesh sieve (opening size 0.15 mm). "−120 Mesh" as used herein refers to a particle size distribution in which at least 90% of the particles pass through a 120-mesh sieve (opening size 0.125 mm). A −120 mesh particle size is considered a very fine particle size, similar to powder.

It will be understood that embodiments of the jamb spray mixes and the dry versions of mixes according to the present disclosure may include crystalline silica in addition to fused silica particles. However, the mixes will include fused silica in the weight content ranges described herein.

According to certain non-limiting embodiments, the jamb spray mix of the present disclosure includes a phosphate bonding compound. The phosphate solidifies into a hard bonding phase when it is subjected to the hot coke oven surfaces and adheres to the silica brick. The jamb spray mix according to the present disclosure comprises 0.1% to 10% phosphate by weight based on the total weight of dry ingredients in the mix. In certain non-limiting embodiments, the jamb spray mix of the present disclosure comprises 2% to 5% of phosphate by weight based on the total weight of dry ingredients in the mix. In certain non-limiting embodiments, the phosphate of the jamb spray mix of the present disclosure comprises sodium phosphate. Other suitable phosphate compounds include potassium phosphate, magnesium phosphate and aluminum phosphate. Accordingly, the phosphate component of the jamb spray mix may comprise sodium phosphate and/or any alternative phosphate compound(s) that form a suitable bonding phase for the coating when the jamb spray mix of the present disclosure is applied to a hot coke oven interior refractory surface.

According to certain non-limiting embodiments, the jamb spray mix of the present disclosure contains 10% to 15% by plasticizer by weight based on total weight of dry ingredients in the mix. The plasticizer imparts plasticity to the mix and keeps the fused silica particles from settling after water is combined with the dry ingredients of the mix. The plasticizer also increases viscosity of the mix for spraying once water has been combined with the dry ingredients of the mix. In certain non-limiting embodiments, the plasticizer comprises a refractory clay selected from ball clay and bentonite. Alternatively, the plasticizer of the mix may include or consist of non-clay based plasticizer, such as a cellulosic plasticizer and/or another organic plasticizer.

According to certain non-limiting embodiments, the jamb spray mix of the present disclosure further comprises boric acid. In certain non-limiting embodiments, the jamb spray mix of the present disclosure comprises 0.1% to 10% of powdered boric acid by weight based on total weight of dry ingredients in the mix. The boric acid serves as a low temperature binding agent.

The water content of the jamb spray mix according to the present disclosure is at least 20% by weight based on total weight of the mix. According to certain non-limiting embodiments, the water content of the jamb spray mix according to the present disclosure is at least 30% by weight based on total weight of the mix. The jamb spray mix of the present disclosure fundamentally differs from a fused silica-containing gunning mix ("Gunite"). Gunite, specifically refractory gunite, is typically a mixture of refractory cement, clay and/or refractory particles, and water that is applied through a gunning hose, which includes a water injection ring that adds water to the gunning mix before it leaves the applicator nozzle. In contrast to the jamb spray mix of the present disclosure, a conventional semi-dry Gunite composition has substantially lower water content, e.g., 2-8% water by total weight. As it emerges from the nozzle, a Gunite spray typically includes no more than 10% water, and the consistency of the Gunite spray as-applied is similar to wet concrete.

A non-limiting embodiment of a method of treating a refractory brick surface region in a coke oven according to the present disclosure includes mixing with water a composition comprising 0.1% to 10% phosphate by weight based on total dry weight of the composition, 5% to 15% plasticizer based on total dry weight of the composition, and the balance including fused silica particles and impurities, so that the jamb spray mix comprises at least 20% by weight water based on total weight of the mix. In contrast to conventional Gunite, the water in the jamb spray mix of the present disclosure is combined with the dry ingredients used to form the mix before the mix is added to the application apparatus and sprayed on the target surface region through the nozzle of the pressurized spray apparatus. The dry ingredients, water, and any other ingredients of the jamb spray mix of the present disclosure may be combined, for example, in a mixer or using any other suitable apparatus for combining the ingredients. Because, in contrast to Gunite, water is not added to the jamb spray mix of the present disclosure at the nozzle, the jamb spray mix can be applied using a conventional pressure wand, for example.

According to certain non-limiting embodiments, a thin coat of the jamb spray mix of the present disclosure may be applied to seal cracks and fill in smaller surface irregularities within the interior of a coke oven, and the thin coat is much less thick than a conventional Gunite coating. The thinner lining results in less refractory material required to repair the coke oven door jamb. The jamb spray also has minimal rebound loss, resulting in less labor to clean after installation has been completed. Conventional gunning commonly requires a crew of three to five people to apply the Gunite onto the oven walls; however, applying the jamb spray mix according to the present disclosure using a conventional pressure wand may require a crew of only two people.

Various non-limiting embodiments of jamb spray mixes according to the present disclosure may include other ingredients including, for example, sintering aids.

According to certain non-limiting embodiments, the jamb spray mix of the present disclosure may be provided in a "wet" version, in which water already has been combined with the dry ingredients to provide the finished jamb spray mix. For example, water may be combined with the dry ingredients at a production plant, and the wet mix may be packaged in plastic pails or bulk containers and sold to distributors or the end user for use in that form.

Other non-limiting embodiments according to the present disclosure are directed to a "dry" product including all of the dry ingredients that are to be included in a jamb spray mix according to the present disclosure. The dry product may be sold to end users who combine the dry product with water to provide the jamb spray mix, which may then be applied to a hot surface region in a coke oven using a conventional pressurized spray apparatus. The weight percentage contents in the dry product are based on the total weight of the dry mix, rather than the total weight of the mix once produced by combining the dry ingredients and water.

Example of Certain Non-Limiting Embodiments

The following table provides an example of ingredients from which a non-limiting example of a jamb spray mix according to the present disclosure was made.

| Ingredient | Content (weight %) |
|---|---|
| Dry Ingredients | Based on Total Weight of Dry Ingredients |
| Plastic Refractory Clay | 13.044% |
| Fused Silica (−30 mesh to +50 mesh) | 21.740% |
| Fused Silica (−120 mesh) | 26.087% |
| Fused silica (−50 mesh to +100 mesh) | 34.781% |
| Trisodium Phosphate | 2.174% |
| Powdered Boric Acid | 2.174% |
| Liquid Ingredients | Based on Total Weight of All Ingredients in Mix |
| Water | 20% |

Although specific concentrations of ingredients and specific fused silica fraction particle sizes are given in the table above, it is contemplated that the concentrations of ingredients and particle sizes may vary within certain ranges and still provide a suitable jamb spray product. The particular refractory clay used in the example included "M&D clay," which is a plastic clay having the consistency of Play-Doh when combined with water. M&D clay is available from KT Clays and has the following ingredients and characteristics: 62% silica, 31% alumina, 10% loss on ignition, and a specific surface area of 40 square meters per gram. Although particular specific particle sizes fractions and contents for the fused silica component are given in the table above, the example provided herein does not encompass all possible options for the fused silica size particle sizes and particle size fractions and contents. Rather, the present inventors determined that the fused silica content given in the table represents one possible fused silica particle size distribution that can produce a suitable embodiment of the jamb spray mix. It is to be understood that the compositions and methods of the present disclosure may incorporate other suitable fused silica particle sizes and concentrations.

The dry ingredients listed in the table were dry-mixed, and subsequently water was added to the dry mix to produce the jamb spray mix. The jamb spray mix was then applied as a thin sealing coat to the hot interior refractory wall of a coke oven using a conventional pressurized applicator, without adding water to the jamb spray mix at the nozzle of the applicator. The resulting jamb spray coating formed when the spray cured on the hot oven wall was compared to a conventional Gunite spray coating formed on a coke oven wall. When applied, the jamb spray mix listed in the table did not provide significant additional structural stability to the oven walls to which it was applied. Rather, it acceptably sealed cracks, seams, and minor imperfections in the oven wall. In contrast, a gunning mix or Gunite is applied much thicker, provides a degree of additional stability to the oven walls, and produces significant overspray during its application. Applying a gunning mix is an involved process that requires a team including a worker who scrapes/trowels the applied material to provide a desired surface condition to the walls (similar to application of plaster to lath strips). The jamb spray mix listed in the table provided better high temperature performance, was easier to install on refractory surfaces, and lasted significantly longer than conventional jamb spray products on the market.

Although the foregoing description has necessarily presented only a limited number of embodiments, those of ordinary skill in the relevant art will appreciate that various changes in the compositions, methods, and other details of the examples that have been described and illustrated herein may be made by those skilled in the art, and all such modifications will remain within the principle and scope of the present disclosure as expressed herein and in the appended claims. It is understood, therefore, that the present invention is not limited to the particular embodiments disclosed or incorporated herein, but is intended to cover modifications that are within the principle and scope of the invention, as defined by the claims. It will also be appreciated by those skilled in the art that changes could be made to the embodiments above without departing from the broad inventive concept thereof.

We claim:

1. A method of making a jamb spray, the method comprising adding water to a dry composition to form a wet composition comprising at least 20% by weight water based on total weight of the wet composition, wherein the dry composition comprises, by weight based on total weight of the dry composition:
   0.1% to 10% phosphate;
   5% to 15% plasticizer;
   at least 60% fused silica particles; and
   impurities.

2. The method of claim 1, wherein the fused silica particles content is 70% to 90% by weight based on total weight of the dry composition.

3. The method of claim 1, wherein the fused silica particles content is 80% to 90% by weight based on total weight of the dry composition.

4. The method of claim 1, wherein the fused silica particles comprise at least two fused silica particle fractions with different particle size distributions.

5. The method of claim 4, wherein the fused silica particle fractions include at least two fused silica particle fractions selected from a first fused silica particle fraction sized −30 mesh to +50 mesh, a second fused silica particle fraction sized −50 mesh to +100 mesh, and a third fused silica particle fraction sized −120 mesh.

6. The method of claim 1, wherein the fused silica particles include a first fused silica particle fraction sized −30 mesh to +50 mesh, a second fused silica particle fraction sized −50 mesh to +100 mesh, and a third fused silica particle fraction sized −120 mesh.

7. The method of claim 1, wherein the dry composition includes, by weight based on total dry weight of the composition, at least one fused silica particle fraction selected from:
   15% to 30% of fused silica particles sized −30 mesh to +50 mesh;
   25% to 45% of fused silica particles sized −50 mesh to +100 mesh; and
   18% to 35% of fused silica particles sized −120 mesh.

8. The method of claim 1, wherein the dry composition includes, by weight based on total weight of the dry composition, at least one fused silica particle fraction selected from:
   18% to 28% of fused silica particles sized −30 mesh to +50 mesh;
   28% to 40% of fused silica particles sized −50 mesh to +100 mesh; and
   21% to 31% of fused silica particles sized −120 mesh.

9. The method of claim 1, wherein the dry composition includes, by weight based on total weight of the dry composition, at least one fused silica particle fraction selected from:
   20% to 25% of fused silica particles sized −30 mesh to +50 mesh;
   32% to 38% of fused silica particles sized −50 mesh to +100 mesh; and
   24% to 28% of fused silica particles sized −120 mesh.

10. The method of claim 1, wherein the phosphate comprises sodium phosphate.

11. The method of claim 1, wherein the phosphate content is 2% to 5% by weight based on the total weight of the dry composition.

12. The method of claim 1, wherein the plasticizer comprises a refractory clay selected from a ball clay and bentonite.

13. The method of claim 1, wherein the dry composition further comprises 0.1% to 10% of powdered boric acid by weight based on total weight of the dry composition.

14. The method of claim 1, wherein the dry composition comprises, by weight based on total weight of the dry composition:
   2% to 5% phosphate;
   5% to 15% plasticizer;
   at least 60% fused silica particles; and
   0.1% to 10% of powdered boric acid.

15. The method of claim 14, wherein the dry composition comprises 70% to 90% by weight fused silica particles based on total weight of the dry composition.

16. The method of claim 1, wherein the wet composition comprises at least 30% by weight water based on total weight of the wet composition.

17. The method of claim 1, comprising adding wet ingredients in addition to water to the dry composition to form the wet composition.

18. The method of claim 1, wherein water and the dry composition are combined to form the wet composition before the wet composition is introduced to an application apparatus configured to apply the wet composition to a target surface region.

19. The method of claim 1, wherein the wet composition is suitable for application using a conventional pressure wand spray apparatus.

20. A method of making a jamb spray, the method comprising:
   adding water to a dry composition to form a wet composition comprising at least 20% by weight water based on total weight of the wet composition, wherein the dry composition comprises, by weight based on total weight of the dry composition,
   0.1% to 10% phosphate,
   5% to 15% plasticizer,
   70% to 90% fused silica particles, and
   impurities,
   wherein the water and the dry composition are combined to form the wet composition before the wet composition is introduced to an application apparatus configured to apply the wet composition to a target surface region.

21. The method of claim 20, comprising adding wet ingredients in addition to the water to the dry composition to form the wet composition.

\* \* \* \* \*